United States Patent Office 3,479,352
Patented Nov. 18, 1969

---

3,479,352
TRICHLOROMETHYL-TERTIARY AMINO SUBSTITUTED CYCLOALKENES AND THEIR PREPARATION
Gerhard H. Alt, Creve Coeur, Mo., assignor to Monsanto Company, St. Louis, Mo., a corporation of Delaware
No Drawing. Filed May 23, 1966, Ser. No. 551,930
Int. Cl. C07c 87/34; C07d 87/54
U.S. Cl. 260—247
9 Claims

ABSTRACT OF THE DISCLOSURE

Compounds of the formula $$(CH_2)_p \begin{bmatrix} CH_3 & CH_3 \\ \diagdown C \diagup \end{bmatrix}_m (CH_2)_q$$
$$X-C=CH-C-N \diagup R \diagdown R^1$$
$$\qquad\qquad |CCl_3$$

wherein $m$ is an integer from zero to one; $p$ and $q$ are each integers from one to three; X is selected from the group consisting of hydrogen, methyl and chlorine; and R and $R^1$ are selected from the group consisting of alkyl having a maximum of 12 carbon atoms or together are a divalent radical selected from the group consisting of —$CH_2CH_2CH_2$—
—$CH_2(CH_2)_2CH_2$—
—$CH_2(CH_2)_3CH_2$—
—$CH_2(CH_2)_4CH_2$—
—$CH_2CH_2OCH_2CH_2$—

These compounds are useful as intermediates in the formation of compounds which are useful as feed additives, providing growth stimulation and for controlling populations of parasitic helminths.

---

This invention relates to a new class of compounds and methods for their preparation. The new compounds are useful as intermediates in the preparation of valuable feed additives providing growth stimulation and a means for controlling populations of parasitic helminths. These derivatives of the present compounds are described and claimed in copending application Ser. No. 551,962, filed May 23, 1966 by Gerhard H. Alt.

The new compounds have the formula:

$$(CH_2)_p \begin{bmatrix} H_3C & CH_3 \\ \diagdown C \diagup \end{bmatrix}_m (CH_2)_q$$
$$X-C=CH-C-N \diagup R \diagdown R'$$
$$\qquad\qquad |C\equiv Cl_3$$

wherein $m$ is an integer from zero to one, wherein $p$ and $q$ are each integers from one to three; wherein X is selected from the class consisting of hydrogen, methyl and chlorine and wherein R and R' are selected from the class consisting of alkyl of up to and including 12 carbon atoms, and alkyl or alkoxy moieties such that R and R' together is a divalent radical selected from the class consisting of

—$CH_2CH_2CH_2$—
—$CH_2(CH_2)_2CH_2$—
—$CH_2CH_2OCH_2CH_2$—
—$CH_2(CH_2)_3CH_2$— and

—$CH_2(CH_2)_4CH_2$—

The preparation of the new compounds proceeds by reacting trichloroacetic acid with dienamines of the formula:

$$(CH)-(CH_2)_{p-1} \begin{bmatrix} H_3C & CH_3 \\ \diagdown C \diagup \end{bmatrix}_m (CH_2)_q R$$
$$X-C\qquad\qquad HC=C-N \diagup \diagdown R'$$

wherein $p$, $q$, $m$, X, and R and R' are as defined above.

The new compounds are prepared by reacting dienamines with trichloroacetic acid in an aromatic hydrocarbon medium, for example, benzene, toluene, ortho-xylene, meta-xylene, para-xylene, mixed xylene isomers and the like. The cyclic dienamines used in making the derivatives of the present invention are known compounds and are described with methods of synthesis in the Journal of the American Chemical Society, vol. 84, p. 4806 (1962) and Annalen, vol. 652, p. 139 (1962). The novel reaction is conducted by dissolving the reactants in the aromatic solvent media and heating at reflux temperatures. Carbon dioxide is evolved during the reaction, and the progress of the reaction is indicated by the extent of evolution.

Further details of the novel procedure and useful compounds so prepared are described below.

EXAMPLE 1

A flask was charged with 200 ml. of toluene, 50 gr. of morpholine, 69.0 gm. of isophoron and 0.1 gm. of p-toluenesulphonic acid and heated under a Dean and Stark trap until all water of reaction had been evolved. The reaction mixture was fractionated in vacuo and a product recovered (B.P. 78.5° C. at 0.3 mm.). The dienamine product (6.2 gm.) was dissolved in 70 ml. of benzene and heated to 70° C. and a solution of 4.9 gm. of trichloroacetic acid in 30 ml. of benzene was added at a rate which enabled the maintenance of the temperature at 70° C. After all the reactants had been combined and no further evolution of $CO_2$ occurred, the reflux was continued for one hour. The resulting compound had the structure:

$$\begin{array}{c} H_3C \quad CH_3 \\ CH_2-C-CH_2 \quad CH_2CH_2 \\ H_3C-C=CH-C-N \diagup \diagdown O \\ \qquad Cl_3\equiv C \qquad CH_2CH_2 \end{array}$$

EXAMPLE 2

The dienamine:

$$\begin{array}{c} CH-CH_2-CH_2 \quad CH_2-CH_2 \\ CH-CH=C-N \diagup \diagdown O \\ \qquad\qquad CH_2CH_2 \end{array}$$

was dissolved in toluene and treated with trichloroacetic acid in general accordance with the procedure of Example 1 until no further $CO_2$ evolution occurred. The resulting product was found to have the formula:

$$\begin{array}{c} CH_2-CH_2-CH_2 \quad CH_2-CH_2 \\ HC=CH-HC-N \diagup \diagdown O \\ \qquad Cl\equiv C \qquad CH_2-CH_2 \end{array}$$

EXAMPLE 3

Following the procedure of Example 1, the dienamine of the formula:

$$\begin{array}{c} H_3C \quad CH_3 \\ CH-C-CH_2 \quad CH_2CH_2 \\ CH-CH=C-N-CH_2CH_2 \end{array}$$

was dissolved in benzene and reacted with a benzene solution of trichloroacetic acid by gradually continuing addition of the acid reactant so as to provide a controlled reaction. The temperature was increased to the reflux temperature to complete the reaction. The product was identified as:

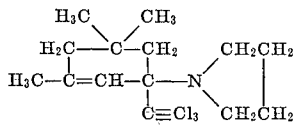

EXAMPLE 4

Trichloroacetic acid was reacted with a dienamine of the formula:

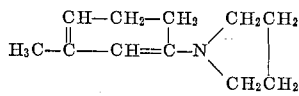

by refluxing the reactants in a benzene solution in substantially the same maner as set forth in Example 1. Carbon dioxide was evolved and when the evolution subsided the reaction mixture was fractionated. After the benzene was evaporated, the product was identified as a compound of the structure:

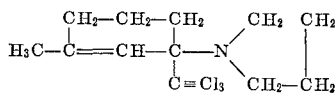

EXAMPLE 5

A dienamine of the formula:

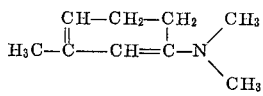

was reacted with trichloroacetic acid by the procedure of Example 1. The product recovered had the structure:

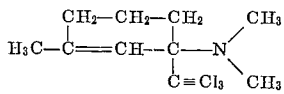

EXAMPLE 6

Using the procedure of Example 2, trichloroacetic acid and the dienamine of the formula:

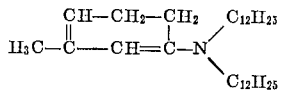

a compound was formed and identified as having the formula:

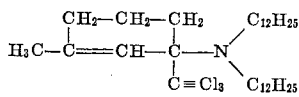

EXAMPLE 7

The dienamine of the formula:

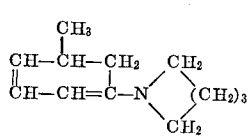

was reacted with trichloroacetic acid by the procedure of Example 2. The resulting product had the formula:

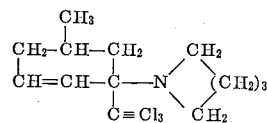

I claim:
1. A compound of the formula:

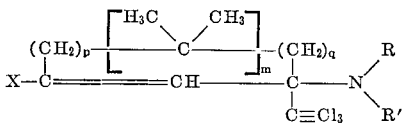

wherein $m$ is an integer from zero to one, wherein $p$ and $q$ are each integers from one to three; wherein X is selected from the class consisting of hydrogen, methyl and chlorine and wherein R and R' are selected from the class consisting of alkyl of up to 12 carbon atoms and alkyl or alkoxy moieties such that R and R' together is a divalent radical selected from the class consisting of $$-CH_2CH_2CH_2-$$

$$-CH_2(CH_2)_2CH_2-, \; -CH_2CH_2OCH_2CH_2-,$$

$$-CH_2(CH_2)_3CH_2-$$

and $-CH_2(CH_2)_4CH_2-$.

2. The compound of claim 1 wherein $m$, $p$ and $q$ are each one, wherein X is methyl, and wherein R and R' together is $-CH_2CH_2OCH_2CH_2-$.

3. The compound of claim 1 wherein $m$ is zero, $p$ is one and $q$ is two, wherein X is hydrogen and wherein R and R' together is $-CH_2(CH_2)_2CH_2-$.

4. The compound of claim 1 wherein each of $p$, $q$ and $m$ is one, wherein X is chlorine and wherein R and R' together is $-CH_2CH_2OCH_2CH_2-$.

5. The compound of claim 1 wherein $m$ is zero, $p$ is one and $q$ is two, wherein X is methyl; and wherein R and R' together is $-CH_2(CH_2)_2CH_2-$.

6. The compound of claim 1 wherein $m$ is zero, $p$ is one, and $q$ is two; and wherein X is methyl and wherein each of R and R' is methyl.

7. A method of preparing a compound of the formula:

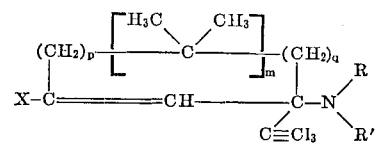

wherein $m$ is an integer from zero to one, wherein $p$ and $q$ are each integers from one to three; wherein X is selected from the class consisting of hydrogen, methyl and chlorine and wherein R and R' are selected from the class consisting of alkyl of up to 12 carbon atoms and alkyl or alkoxy moieties such that R and R' together is a divalent radical selected from the class consisting of $$-CH_2CH_2CH_2-$$

$$-CH_2(CH_2)_2CH_2-, \; -CH_2CH_2OCH_2CH_2-,$$

$$-CH_2(CH_2)_3CH_2-$$

and —$CH_2(CH_2)_4CH_2$—; which comprises reacting trichloroacetic acid with a compound of the formula:

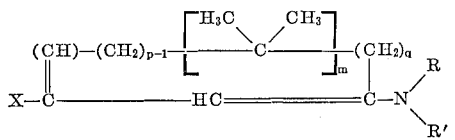

wherein $p$, $q$, $m$, X, R and R' are as defined above.

8. The method of claim 7 wherein $m$, $p$ and $q$ are each one; wherein X is methyl and wherein R and R' together is —$CH_2CH_2OCH_2CH_2$—.

9. The method of claim 7 wherein $m$, $p$ and $q$ are each one; wherein X is chlorine and wherein R and R' together is —$CH_2CH_2OCH_2CH_2$—.

No references cited.

ALEX MAZEL, Primary Examiner

J. TOVAR, Assistant Examiner

U.S. Cl. X.R.

260—239, 293, 297, 326.8, 326.81, 563; 424—248, 244, 267, 274